United States Patent [19]

Reese

[11] Patent Number: 5,345,486
[45] Date of Patent: Sep. 6, 1994

[54] FUEL BUNDLE WITH IMPROVED RESISTANCE TO BULGE AND IMPROVED CRITICAL POWER PERFORMANCE

[75] Inventor: Anthony P. Reese, San Jose, Calif.

[73] Assignee: General Electric Company, San Jose, Calif.

[21] Appl. No.: 8,441

[22] Filed: Jan. 25, 1993

[51] Int. Cl.⁵ .............................................. G21C 3/32
[52] U.S. Cl. .................................... 376/443; 376/448
[58] Field of Search ............... 376/443, 439, 438, 444, 376/448; 976/DIG. 60, DIG. 64

[56] References Cited

U.S. PATENT DOCUMENTS

| | | | |
|---|---|---|---|
| Re. 33,818 | 2/1992 | Crowther, Jr. et al. | 376/443 |
| Re. 34,246 | 5/1993 | Crowther et al. | 376/443 |
| 4,585,614 | 4/1986 | Helmersson | 376/434 |
| 4,707,328 | 11/1987 | Arbink et al. | 376/446 |
| 4,708,845 | 11/1987 | Mildrum et al. | 376/435 |
| 4,889,684 | 12/1989 | Johansson | 376/444 |
| 4,970,047 | 11/1990 | Ueda et al. | 376/443 |
| 5,068,082 | 11/1991 | Ueda et al. | 376/428 |
| 5,128,097 | 7/1992 | Fukasawa et al. | 376/438 |

Primary Examiner—Donald P. Walsh
Assistant Examiner—Meena Chelliah
Attorney, Agent, or Firm—J. S. Beulick

[57] ABSTRACT

In a fuel bundle having an array of fuel rods of 9-by-9 or greater, removal of the corner fuel rods from the array occurs. This removal enables the remainder of the array rod-to-rod pitch to be decreased. Further, and over this array with the corner fuel rod removed, a fuel bundle channel having rounded corners of increased radius of curvature or flattened corners imparting a broadly taped curvature is utilized. In both cases, the effective flat span of the fuel bundle sides is reduced with the result that the new fuel bundle incorporates improved resistance to channel bulge with improved critical power.

10 Claims, 5 Drawing Sheets

FUEL BUNDLE WITH IMPROVED RESISTANCE TO BULGE AND IMPROVED CRITICAL POWER PERFORMANCE

This invention relates to a fuel bundle and channel configuration for a boiling water nuclear reactor. Specifically, a fuel bundle construction is set forth for relatively dense fuel rod arrays (exceeding 8-by-8) in which a corner fuel rod is removed, the rod pitch can be increased, and the channels at the corners either provided with an increased radius of curvature or provided with a flattened corner construction. There results a fuel bundle having improved resistance to channel bulge and improved critical power.

BACKGROUND OF THE INVENTION

Boiling water nuclear reactors have fuel bundles of well known construction. The fuel bundles each include a lower tie plate for supporting a matrix of upstanding fuel rods and for inletting moderating water coolant. The fuel bundle includes an array of upstanding fuel rods at least some of which extend to an upper tie plate. The upper tie plate serves to hold the fuel bundle together through at least some of the fuel rods and to permit the outflow of water and generated steam. To prevent abrading contact between dynamically vibrating long (about 160 inches) and relatively thin fuel rods, so-called spacers are placed at selected vertical elevations around the fuel rods within the fuel bundle. Finally, the entire assembly is enclosed by a channel, this channel extending from the vicinity of the lower tie plate to the vicinity of the upper tie plate.

The fuel bundle construction is essentially a square of approximately 5.3 by 5.3 inches interior dimension. It is bounded by a correspondingly square channel. The normal channel construction includes four rounded corners and four flat sides extending there between. The fuel bundles—placed within their square channels—are arrayed in parallel upstanding relation one to another with their respective flat channel sides in parallel alignment one to another. This being the case, the fuel bundles define between their channels a cruciform shaped interstitial volume. It is into this cruciform shaped interstitial volume that cruciform shaped control rods penetrate for controlling the nuclear reaction.

The channels serve to define two flow regions in the reactor core. One flow region is through the fuel bundles for the generation of steam from which power is ultimately extracted. The other flow region is the so-called core bypass region and includes the cruciform interstitial region defined between the fuel bundles. This region is exterior of the fuel bundle channels and occupies the region interstitially of the fuel bundles which is penetrated by the reactor control rods. When the control rods are inserted, thermal neutrons are absorbed and the nuclear reaction is abated. When the control rods are withdrawn, water within the core bypass region replaces the control rods and enhances neutron moderation which in turn promotes the nuclear reaction.

Typically, and when fuel bundles are expended, only the fuel rods, tie plates and spacers are replaced. Channels can be replaced into a reactor and last for more than one fuel bundle lifetime. These channels are limited in their life time by channel "bow" and channel "bulge."

Channel "bow" is the tendency of the entire channel to warp in one direction or another responsive to radiation gradient across the entire channel. Such bow is a function of many factors including whether the reactor has uneven fuel bundle spacing (as in so-called D-lattice constructions) or even fuel bundle spacing (as in so-called C-lattice constructions). Further, channel bow can be a function of where in the reactor core the fuel bundle is located. Because this condition is a function of overall fuel bundle radiation gradient, it is not subject to correction by the modifications of this disclosure.

Channel bulge is the tendency of the flat sides of the fuel bundle to become tubular. This bulge phenomena is subject to reduction by the disclosure herein. Accordingly, it will suffice to review the factors which cause channel bulge so that the tendered design which improves resistance to this phenomena can be understood.

Channel bulge is the result of a combination of two conditions working upon the flat sides of the channels. One condition is the force of the pressure differential acting between the relatively high pressure region in the interior of the fuel bundle and the relatively low pressure region exterior of the fuel bundle channel in the core bypass region. The other condition is the ambient neutron radiation. A discussion of these two effects can lead to an understanding of channel bulge phenomenon.

Fluid flow of the coolant through the fuel bundle is promoted by a pressure differential. This pressure differential includes a relatively high pressure region in the bottom of the fuel bundle changing slowly to a lower pressure region in the upper two phase region of the fuel bundle at the discharge of the fuel bundle flow path through the upper tie plate. This pressure differential is needed to overcome the forces of fluid friction as the water moderator passes between the fuel rods and through the spacers. Further, the forces of acceleration consume pressure drop as the relatively slower moving liquid moderator turns into relatively faster moving generated steam.

In modern fuel bundle design, this pressure resistance to flow interior of the fuel bundle has become aggravated. Specifically, and in order to realize maximum nuclear and thermodynamic efficiencies, the density of the arrays of fuel rods within modern boiling water fuel bundles has increased. This increase has in turn lead to greater pressure drop requirements for assuring the necessary flow through the fuel rods and spacers interior of the fuel bundle.

Exterior of the fuel bundle channels and in the core bypass region another lower pressure regime exists. Water moderator is normally discharged directly to the core bypass region. In this region the water does not appreciably boil and has essentially a low resistance flow path. Consequently, the core bypass region is a zone of low pressure.

The fuel bundle channels residing in this pressure domain thus have a relatively high pressure interior and a low pressure exterior. Accordingly, the flat sides of the fuel bundle channels come under stress. This stress—if completely relaxed—would cause the fuel bundle channels to become tubular or cylindrical. In any event, the flat sides of the fuel bundles have the tendency to bulge in response to the differential pressure.

Unfortunately, the ambient radiation has the effect of relaxing the stress within the channels due to a phenomenon called "radiation induced creep". This relaxing of stress causes an elastically deformed and bulged channel to retain its bulge. Accordingly, and with time, these bulges both increase in dimension and become permanent. Increase in dimension continues until the bulged sides either interfere with the required control rod travel or alternatively effect the nuclear and thermodynamic performance of the fuel bundle. Thereafter, the channels must be replaced. Naturally, any design which prolongs the tendency of the fuel bundle channels to resist this bulge phenomena is desirable.

It will be further understood that bulge is a combination of the pressure differential force—which is at a maximum at the bottom of the fuel bundle—and radiation—which is at a maximum roughly in the middle of the fuel bundle. As these two effects combine, experience has shown that the bulge phenomena has its maximum effect at the lower ⅓ to ¼ of a fuel bundle.

The increased density of the fuel bundle array has had another adverse effect on fuel bundles. This effect is related to the increase in fuel rod pitch—or the decrease in fuel rod interstitial separation and fuel rod to channel spacing across the fuel bundle. This decrease in fuel rod to fuel rod spacing or fuel rod to channel spacing aggravates the critical power of certain fuel rods within the fuel bundle—especially those fuel rods which are in the corner locations.

Critical power is defined as that power output of a fuel rod that causes boiling transition—the "drying out" of the water layer covering a fuel rod—to occur. The point at which boiling transition occurs is effected by the fluid flow occurring over the surface of the fuel rod. As a general proposition, a greater moderator flow over the surface of the fuel rod permits a larger power output of the fuel rod before the limits of critical power are exceeded.

A dense fuel array aggravates the critical power phenomena in at least two ways. First, as the total number of fuel rods within the fuel bundle cross section increases, the spacing between the fuel rods must inevitably decrease. When the spacing between the fuel rods decreases, the critical power of the fuel rods is generally decreased.

Secondly, the spacing between the fuel rods and the surrounding channel decreases. This is especially true at the corner locations. When it is remembered that fuel rods at these locations are adjacent—on at least two sides—to the greater moderator density of the core bypass region, it will be understood that these fuel rods have a tendency to have a relatively greater power output. Consequently, the restriction of the flow area between these fuel rods and the channel at the corner locations causes these fuel rods to be limiting in their critical power performance.

The reader will also remember that fuel rod spacers are placed at selected elevations along the fuel bundle. This being the case, further restriction of flow occurs at the fuel rod spacers—again especially in the corner locations.

It will further be understood that the construction of the fuel bundle channels—and especially the thickness of the channel walls—is an art which compromises two competing phenomena. The first phenomena is the ability of the fuel channel to resist bulge. The second phenomena is the parasitic absorption of neutrons by the metal which makes up the fuel bundle channel. Consequently, and as disclosed in Crowther et al. U.S. Pat. No. 4,749,544 entitled THIN WALLED CHANNEL issued Jun. 7, 1988 (now Reissue U.S. Pat. No. RE 33,818, allowed Aug. 7, 1992), it is known to vary the construction of the thickness of the channel wall as a function of the stress encountered locally by the channel wall. Where stresses are small, the channel wall is of a relatively thin construction. Where the stresses are large, the channel wall is of a thicker construction.

The reader will appreciate that the above considerations are selected reactor core phenomena which are applicable to understanding this invention. The combined relevance of these consideration is necessary to understand the following fuel bundle design.

SUMMARY OF THE INVENTION

In a fuel bundle having an array of fuel rods of 9-by-9 or greater, removal of the corner fuel rods from the array occurs. This removal enables the remainder of the array rod-to-rod pitch to be increased as well as the equalization of the rod-to-rod clearance with the rod-to-channel clearance. Further, and over this array with the corner fuel rod removed, a fuel bundle channel having rounded corners of increased radius of curvature or flattened corners imparting a broadly tapered curvature is utilized. In both cases, the effective flat span of the fuel bundle sides is reduced with the result that the new fuel bundle incorporates improved resistance to channel bulge with improved critical power.

DESCRIPTION OF THE PREFERRED EMBODIMENT

Figure 1:
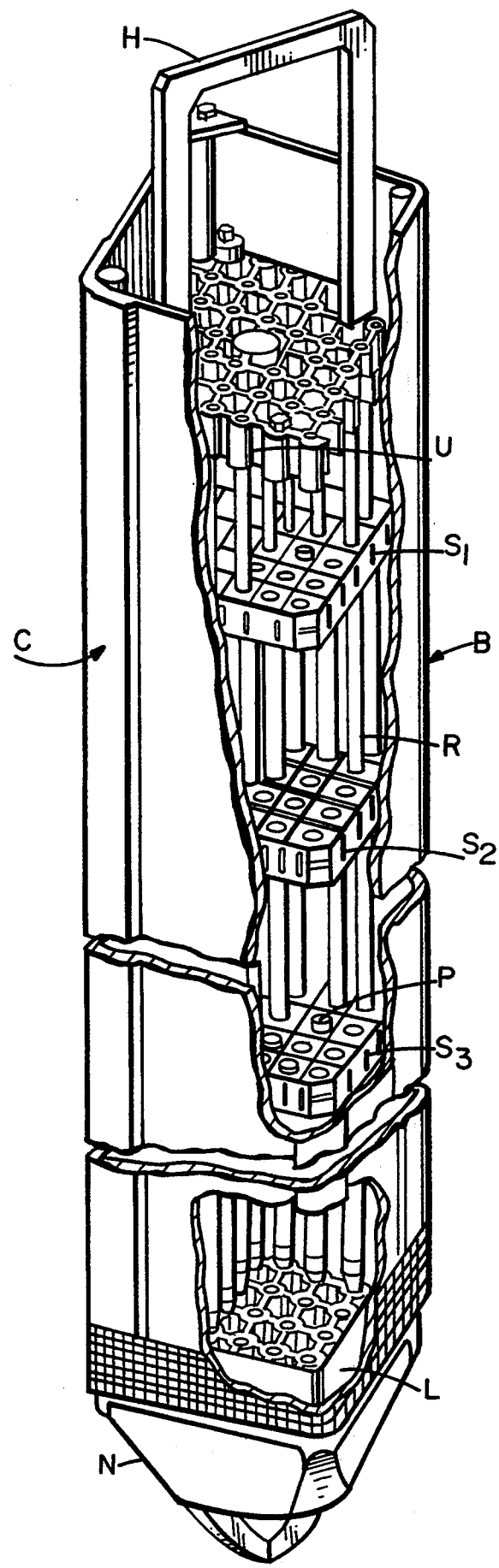
FIG. 1 is a perspective view of a fuel bundle capable of incorporating this invention, this figure showing the lower tie plate, the upper tie plate, the fuel rods extending there between including full length fuel rods and part length fuel rods, and the relative elevations of some of the spacers.

Referring to FIG. 1, a fuel bundle B is shown in the upper and lower portion thereof having three out of a typical seven shown with spacers $S_1$, $S_2$, and $S_3$ between an upper tie plate U and a lower tie plate L. The fuel bundle includes an array of fuel rods including full length fuel rods R and part length fuel rods P. As can be seen, part length fuel rods P terminate at spacer $S_3$. A channel C is shown surrounding the fuel bundle extending from lower tie plate L to upper tie plate U. As is well known, a bail or handle H permits the fuel bundle to be handled as a unit.

Figure 2:
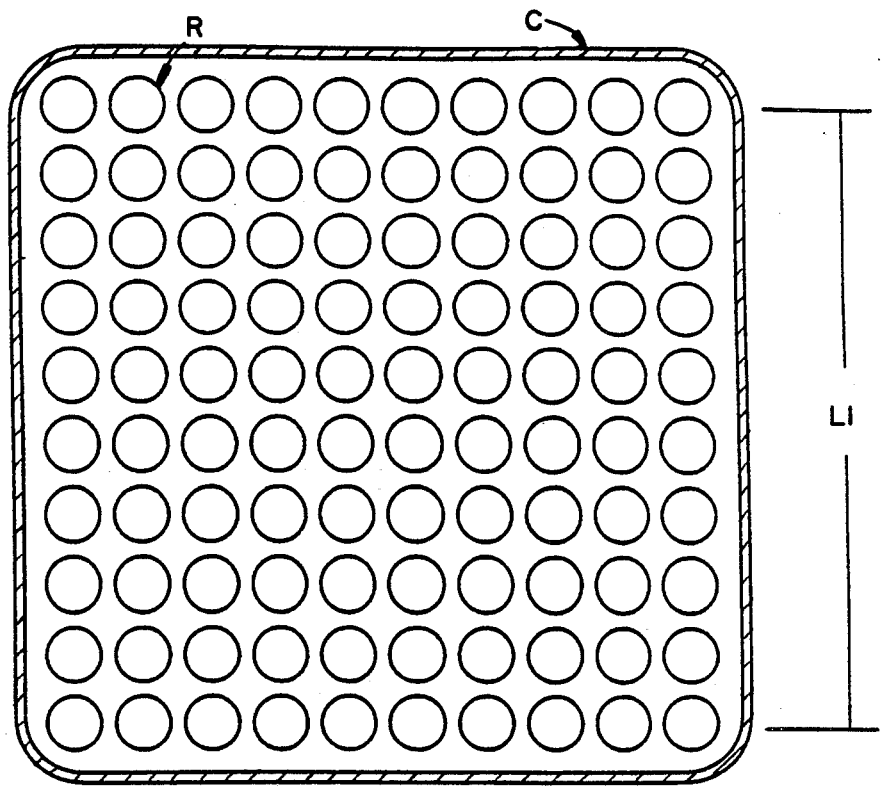
FIG. 2 is a section taken across a fuel bundle similar to FIG. 1, this section displaying a prior art 10-by-10 array with the corner fuel rods left in place in the array.

FIG. 2 shows a top view typical boiling water channel geometry such as that which might be used with a fuel bundle such as that illustrated in FIG. 1. Channel C' encloses a 10-by-10 lattice of fuel rods. As can be observed, the prior art channel C' is square with slightly rounded corners having a radius in the order of less than 0.5 inches. This prior art channel C' includes four relatively long flat channel sides one of these channel sides being denoted by the dimension $L_1$.

Figure 3:
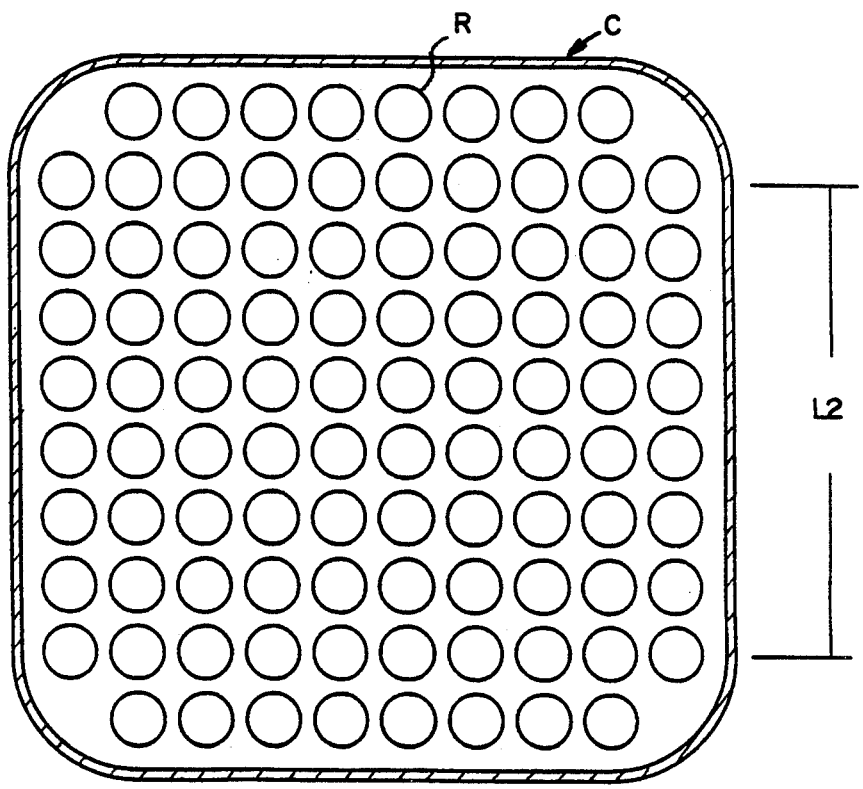
FIG. 3 is a section taken across a fuel bundle similar to FIG. 1, this section displaying the 10-by-10 array of this invention with the corner fuel rods removed from the array.

FIG. 3 shows a bundle incorporating the present invention. A 10-by-10 matrix of fuel rods is disclosed in which the corner fuel rods R has been removed. Rounding of the corners is shown. This rounding is to a radius in the order of 0.750 of an inch.

The measures labelled "L1" in FIG. 2 and "L2" in FIG. 3 describes the length of the flat portion of the channel wall. The corners, being rounded are more rigid than the flat sides. The bulge deflection occurs over the flat sides. The equations describing the deflection are well known. Specifically the deflection at the midpoint of the flat side is, $$y = \frac{pL^4}{384EI}$$

where y is the midpoint deflection, p is the pressure differential, L is the length of the flat side and E1 describes bending properties associated with the strength and thickness of the channel walls. Since the deflection is proportional to the fourth power of the length of the flat sides a relatively small change in this dimension will yield a large reduction in the deflection magnitude.

Referring to FIGS. 2 and 3, the length L2 is about 15% less than L1. This translates to a 50% reduction in the channel bulge deflection. It is therefore seen that the reduction in dimension is other than trivial.

Although FIGS. 2 and 3 demonstrate the invention with a 10×10 array or rods, the invention could be incorporated into any sized lattice having a lattice dimension 9-by-9 or higher.

Figure 4:
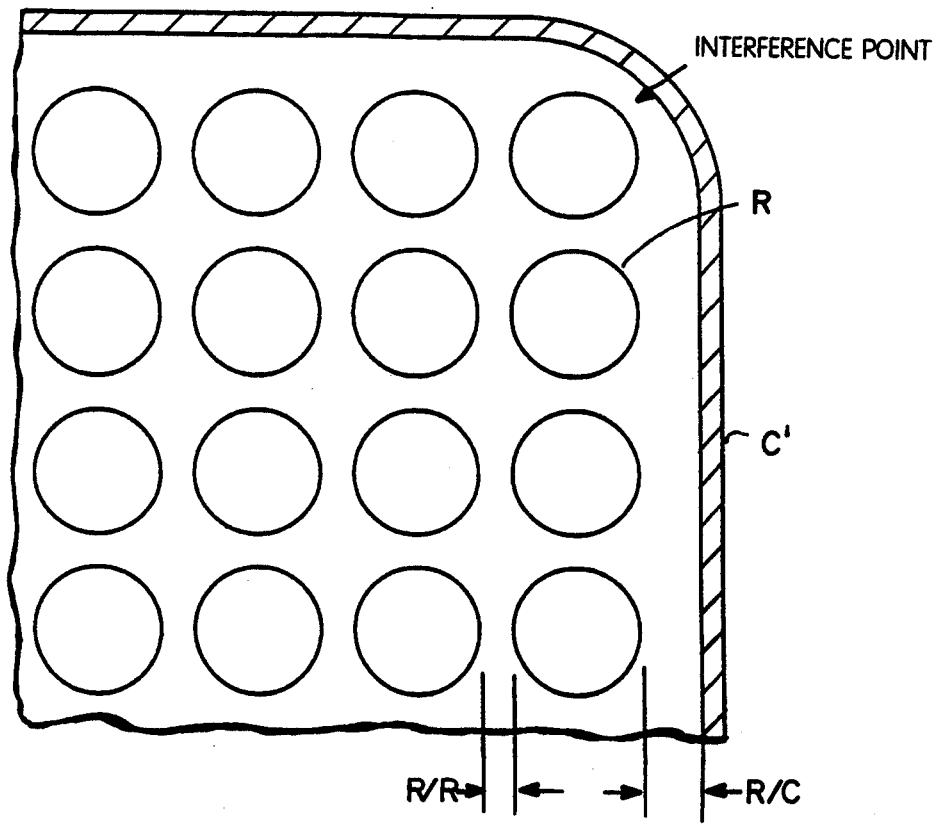
FIG. 4 is a partial section of the prior art taken in the vicinity of the corner illustrating what could be either a 9-by-9 array a 10-by-10 array or an 11-by-11array showing the corner fuel rod and its close proximity to the corner.

Removing the four corner rods has another benefit associated with the thermal hydraulic performance of the bundle. It is known that decreasing fuel rod pitch, that is the distance between the rods, has a detrimental impact on critical power performance. Ideally the distance between each rod should be equal to the distance between the channel wall and the outer row of fuel rods. As fuel bundle designs have evolved from 7×7 to 8×8, 9×9 and 10×10 lattice structures there is an interference problem between the corner fuel rods and the rounded corner of the channel wall. This interference forces the rod pitch away from the ideal as shown in FIG. 4. Note that the rod-to-rod spacing "R/R" of rods R is much smaller than the rod-to-channel spacing "R/C" from channel C'. This has caused the critical power performance of the interior rods to be substantially less than the outer rods.

Figure 5:
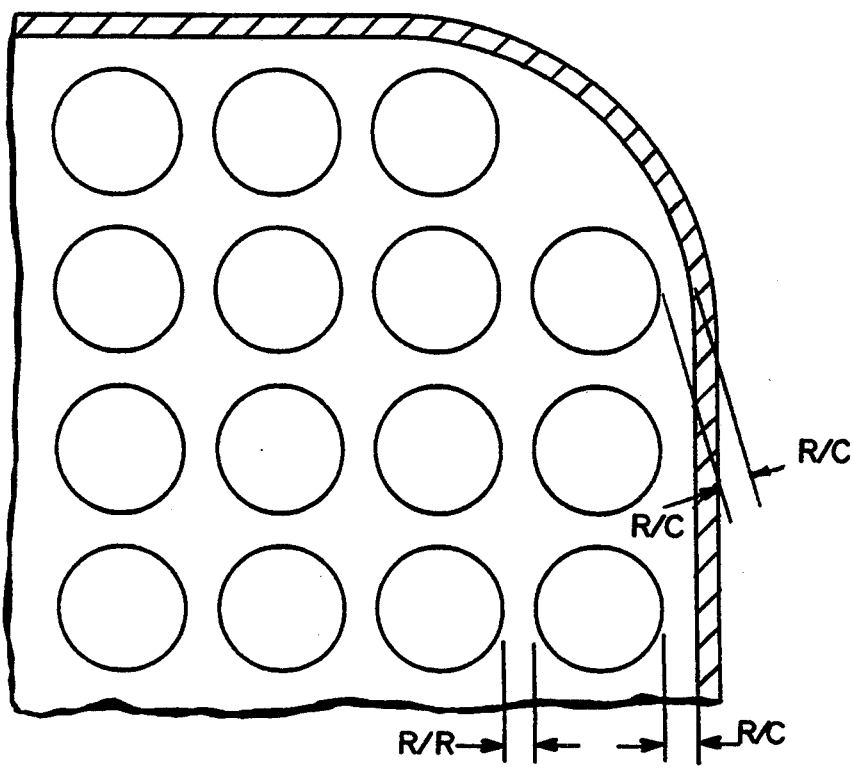
FIG. 5 is a partial section similar to FIG. 4 illustrating the fuel rod array of this invention in the vicinity of the corner and showing the removal of the corner fuel rod with the increased pitch of the fuel rods and their proximity to the corner in accordance with the teachings of this invention.

Removing the corner rods eliminates the interference problem and allows the ideal pitch to be used as seen in FIG. 5.

With reference to FIG. 5, it will be understood that the expansion of the interstitial distance between the fuel rods occurs in at least three aspects. First, the rod R to rod R distance R/R is expanded. Second, the rod to channel C distance R/C is expanded in the vicinity of the corners. Finally, the rod to rod spacing and the rod to channel spacings are equalized. Expanding the rod pitch in this way will improve the thermal hydraulic performance of all the interior fuel rods with some reduction in the performance of the outer rods. This is expected to result in a more balanced and enhanced overall performance.

Reference has been made to Crowther et al. U.S. Pat. No. 4,749,544 entitled THIN WALLED CHANNEL. This prior art patent utilized a channel whose wall has various thickness dependent upon the local stress encountered in the wall of the channel. A view of a cross section of a conventional channel wall incorporating this construction is illustrated in FIG. 6.

Figure 6:
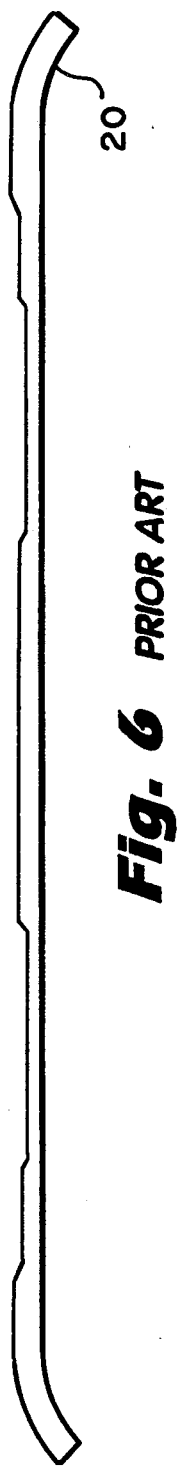
FIG. 6 is a plan section of a prior art channel wall configuration taken through the channel wall of a fuel bundle in the vicinity of arrows 6—6 of FIG. 1.
Figure 7:
FIG. 7 is a plan section of the channel wall configuration taken through the channel wall of a fuel bundle in the vicinity of arrows 6—6 of FIG. 1 illustrating the channel of this invention with rounded corners of increased radius of curvature.

FIG. 6 illustrates the details of the conventional thick-thin side of a conventional channel. Referring to FIG. 7, the design principles of the Crowther et al. '544 patent are incorporated with a large corner radius of 0.755 inches at 21 as compared to the smaller corner radius of 0.450 inches at 20 of FIG. 6.

Figure 8:
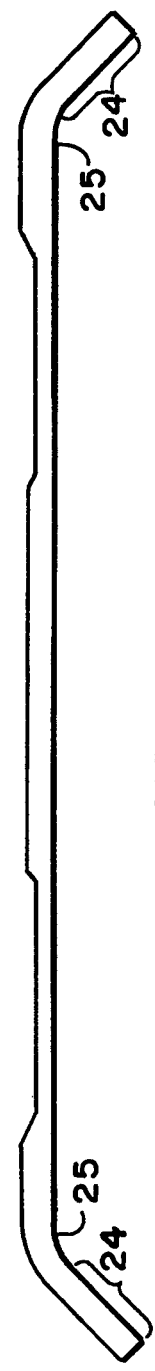
FIG. 8 is a plan section of the channel wall configuration taken through the channel wall of a fuel bundle in the vicinity of arrows 6—6 of FIG. 1 illustrating the channel of this invention with truncated corners; and, FIG. 9 is a plan view of a fuel bundle channel only constructed with side according to the illustration of FIG. 8.
Figure 9:
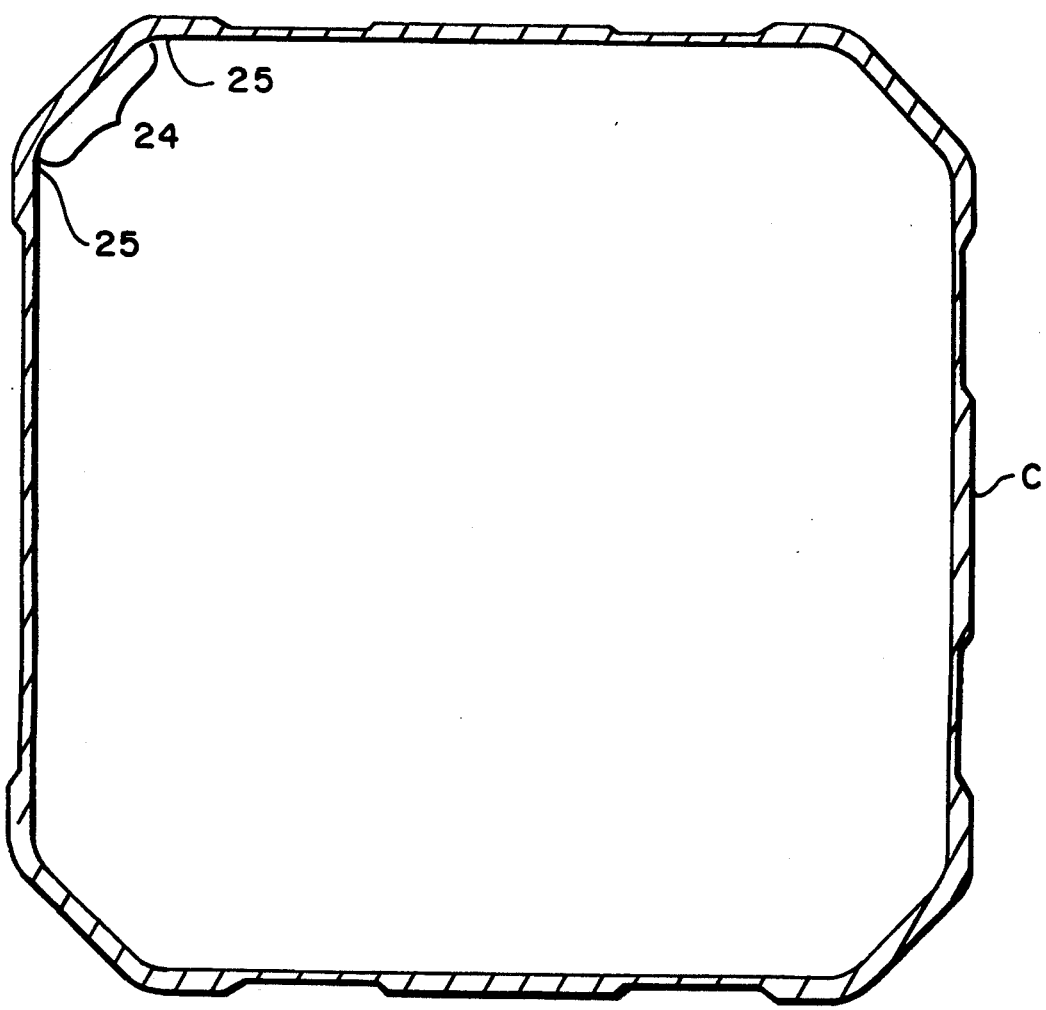

Referring to FIG. 8, a cross section is disclosed in which flattened corners are utilized. These flattened corners have a dimension of 0.666 inches at each corner, only 0.333 inches of which is show at 24. This flattened corner configuration includes two small radius 45° bends 25 of 0.284 inches rather than one large radius 90° degree bend. A full channel drawing of this new configuration is shown in FIG. 9.

The three configurations described above were analyzed with a beam bending analysis program to calculate the mid-span deflection under a uniform internal pressure. The results of that analysis are shown in Table 1. Also shown in Table 1 is the cross sectional area of each of the designs. The large corner radius (FIG. 7) gives the channel 16% greater strength relative to the base design against channel bulge with 2.2% more material. The flattened corner design (FIG. 8) gives a 20% strength improvement with only 0.3% more material.

TABLE 1

| CHANNEL STRENGTH COMPARISON | | |
|---|---|---|
| Design | Mid-Span Deflection | Cross-Sectional Area |
| FIG. 6 | .0331 in (base) | 1.436 sq in (base) |
| FIG. 7 | .0279 in (−16%) | 1.468 sq in (+2.2%) |
| FIG. 8 | .0265 in (−20%) | 1.440 sq in (+0.3%) |

A further advantage of the flattened corner design is that it distributes the coolant flow more evenly over the bundle since it does not have the open areas in the corners as does the large corner design.

It is useful in understanding this invention to present a table of the representative dimensions for the various densities of fuel rod arrays contemplated. Therefore, in the following Table II, the dimensions are given. In Table II the dimensions for an array with the corner rod (W/CR) [the prior art] and the dimensions for an array without the corner rod (WO CR) are given:

TABLE II

|  | 9 × 9 | | 10 × 10 | | 11 × 11 | |
| --- | --- | --- | --- | --- | --- | --- |
|  | W/CR | WO CR | W/CR | WO CR | W/CR | WO CR |
| Corner Radius | 0.450 | 0.923 | 0.450 | 0.833 | 0.450 | 0.755 |
| Rod Diameter | 0.440 | 0.440 | 0.404 | 0.404 | 0.372 | 0.372 |
| Rod Pitch | 0.566 | 0.572 | 0.510 | 0.516 | 0.461 | 0.471 |
| R/R Spacing | 0.126 | 0.132 | 0.106 | 0.112 | 0.089 | 0.099 |
| R/C Spacing | 0.155 | 0.131 | 0.142 | 0.115 | 0.148 | 0.098 |

Comparison of the data illustrates dramatic improvement in the rod to channel spacing R/C. Further, it will be seen that in all cases the rod-to-rod spacing is improved.

While on 9-by-9, 10-by-10, and 11-by-11 arrays have been shown, it will be understood that the principles of this invention can extend to other more dense array such as 12-by-12.

I claim:

1. In a fuel bundle having,
   a lower tie plate for support of an upstanding array of fuel rods and admitting an inflow of moderating water coolant;
   an array of upstanding fuel rods having a matrix density of 9-by-9 or greater, said array having the corner rods missing so that the upper row, the lower row, the right hand column and the left hand column have a number of rods two less than the density of said array;
   an upper tie plate for supporting at least some of said fuel rods of said array in said upright vertical position;
   a plurality of spacers at preselected elevations, each spacer surrounding at its elevation each said fuel rod to maintain said fuel rods in spaced apart relation without abrading contact between said fuel rods; and,
   a fuel bundle channel extending from the vicinity of said lower tie plate to the vicinity of said upper tie plate, said channel having rounded corners of increased radius of curvature, wherein said radius of curvature exceeds the pitch of said fuel rods, and further wherein spacing between rods within the array is substantially equal to spacing between outermost rods of the array and the channel.

2. The fuel bundle of claim 1 and wherein said array is a 9-by-9 array.

3. The fuel bundle of claim 1 and wherein said array is a 10-by-10 array.

4. The fuel bundle of claim 1 and wherein said array is an 11-by-11 array.

5. The fuel bundle of claim 3 and wherein the planar sides of said channel have a thickness proportional to the stress of said planar sides.

6. In a fuel bundle having,
   a lower tie plate for support of an upstanding array of fuel rods and admitting an inflow of moderating water coolant;
   an array of upstanding fuel rods having a matrix density of 9-by-9 or greater, said array having the corner rods missing so that the upper row, the lower row, the right hand column and the left hand column have a number of rods two less than the density of said array;
   an upper tie plate for supporting at least some of said fuel rods of said array in said upright vertical position;
   a plurality of spacers at preselected elevations, each spacer surrounding at its elevation each said fuel rod to maintain said fuel rods in spaced apart relation without abrading contact between said fuel rods; and,
   a fuel bundle channel extending from the vicinity of said lower tie plate to the vicinity of said upper tie plate, said channel having corners truncated by a channel sections of 45° with respect to the sides of said channels, said truncated sides maintaining the same interstitial distance between said fuel rods and said channels at said truncated sides as the distance between said fuel rods within the array.

7. The fuel bundle of claim 6 and wherein the planar sides of said channel have a thickness proportional to the stress on said planar sides.

8. The fuel bundle of claim 6 and wherein said array is a 9-by-9 array.

9. The fuel bundle of claim 6 and wherein said array is a 10-by-10 array.

10. The fuel bundle of claim 6 and wherein said array is an 11-by-11 array.

* * * * *